UNITED STATES PATENT OFFICE.

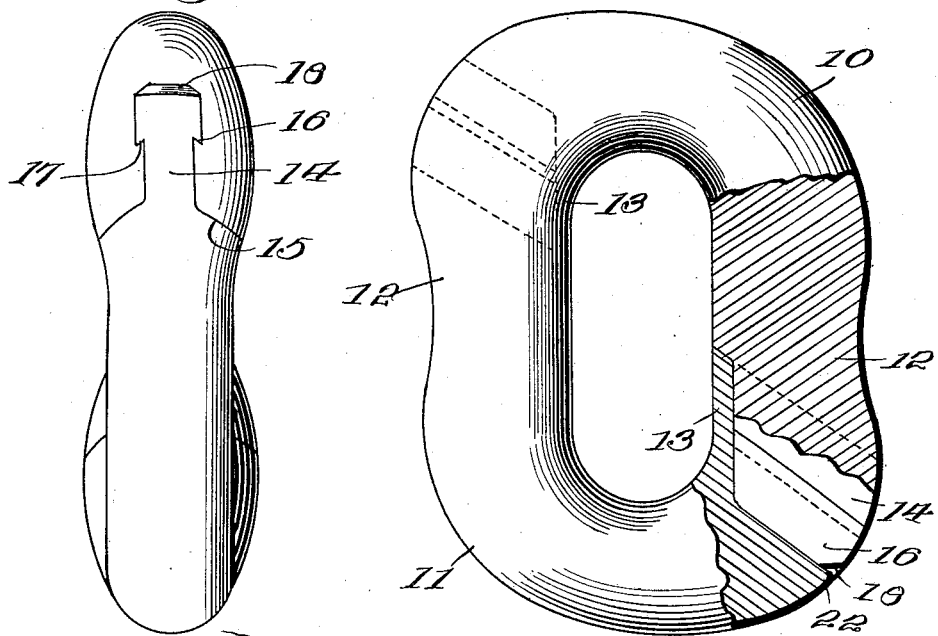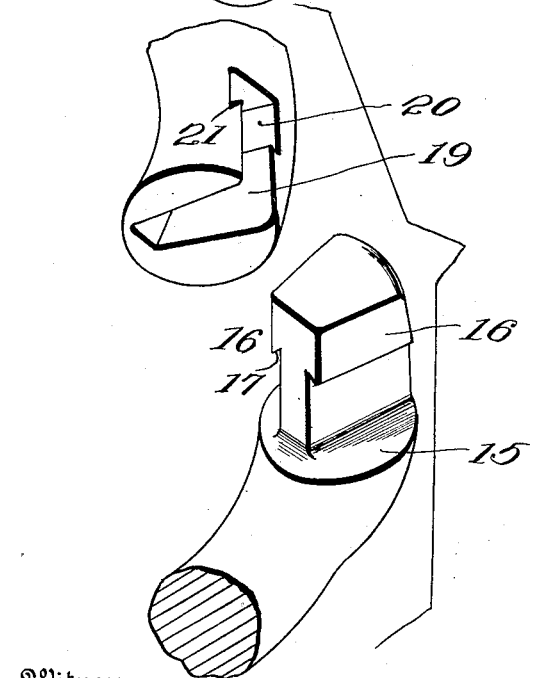

MAURICE TOBIN, OF MARION, OHIO.

SELF-LOCKING CHAIN-COUPLING.

1,065,564. Specification of Letters Patent. Patented June 24, 1913.

Application filed May 1, 1912. Serial No. 694,562.

*To all whom it may concern:*

Be it known that I, MAURICE TOBIN, citizen of the United States, residing at Marion, in the county of Marion and State of Ohio, have invented certain new and useful Improvements in Self-Locking Chain-Couplers, of which the following is a specification.

My invention relates to new and useful improvements in self-locking chain links, and the object of my invention is to provide a chain link including two symmetrical half links having their ends fixed for sliding engagement with each other to form a connecting link.

A further object of my invention is to so position and form the locking structure for securing the half links together that all strain exerted upon opposite sides of the completed link may be supported without any tendency of opening up the link.

A further object of my invention is to provide such a joint construction as to render the employment of bridges, pins and other locking devices now used, unnecessary. And a still further object of my invention is to provide means whereby the link members may be absolutely locked and secured against separation, if desired.

With these and other objects in view, the invention will be more fully described, illustrated in the accompanying drawing, and then specifically pointed out in the claims which are attached to and form a part of this application.

In the drawing: Figure 1 is a side elevation of the link; Fig. 2 is a front elevation of the same, parts being shown in section to better disclose the locking structure; Fig. 3 is a perspective view of the interlocking terminals of the link members.

Corresponding and like parts are referred to in the following description and indicated in all the views of the drawing by the same reference characters.

The preferred embodiment of my invention includes a link made up of two symmetrical half links 10 and 11 having their ends formed to slide into locking engagement with each other. These link members are not only symmetrically formed but are identical in construction even to the slightest detail. Each half link includes a U-shaped body member having parallel spaced shanks 12 and 13, the former of which is considerably longer than the latter. The free ends of both shanks are formed at an angle to their longitudinal axes, their end faces preferably lying in a common plane.

Broadly speaking, the half links are locked together by means of shouldered tenons formed upon the ends of the longer shanks and engaging in undercut mortises formed in the ends of the shorter shanks. Each of the two tenons includes a body portion 14 extending from the end face of the longer shank 12 and preferably trapezoidal in section, the inner and outer faces being parallel, while the side faces converge inwardly slightly, as shown. The outer faces of the tenons form a continuation of the outer portion of the shanks, while the inner face, in each case, is spaced from the inner portion of the shank. The side faces are spaced from the sides of the shank to form shoulders 15 against which the end of the shorter shank of the other link member bears when the link members are in assembled position. The lower parts of the inner and side faces of the tenons are curved outwardly at their lines of juncture with the end faces of the shanks to strengthen the structure. The sides of the tenons are provided at their free ends with oppositely directed shoulders 16, the outer faces of which are parallel to their respective side faces of the tenons and the lower faces of which are directed inwardly at an angle toward the free end faces of the tenons, as shown at 17. The upper portions of the outer faces of the tenons are cut-away or beveled as at 18 for a reason which will be hereinafter explained, and the outer faces proper of the chains are formed parallel to the corresponding end faces of the link members. The end portion of the shorter shank of each link member is mortised or recessed to provide a seat for the tenon of the co-acting link member. The mortises are formed through the outer and end faces of the shorter shanks, as shown at 19 and are undercut or enlarged at their inner ends at 20 to form angular shoulders 21 for locking engagement with the shoulders of the tenons. The combined recess and undercut portion of each link member conform accurately in shape to the tenon and shoulders of the other link member to form close joints and so prevent all independent movement of the link members when locked together.

In operation, the link members are connected as shown in the drawing, the inner sides of the tenons being positioned in alinement with the open outer sides of the mortises and the link members then moved to slide their shanks into alinement with each other, the tenons seating in the mortises and the shoulders of the tenons engaging with the shoulders or undercut portions of the mortises.

As will be seen by referring to the drawing, any opposed strain applied directly to opposite parts of the link, as would be the case of all strains upon the link, when in use, will not open the link, but will, in most cases, serve to tighten the engagement between the link members.

If the link is to be permanent in its use, as is the case when employed in mending a broken chain, and absolute security is desired, the portion 22 of each link member may be struck down to seat against the beveled portion 18 of the other link member and so absolutely lock the parts of the link against disengagement. As this portion 22 of the link is comparatively thin this may be accomplished by a few light blows of a hammer or other suitable tool.

Having thus described the invention, what is claimed as new is:

1. A link including two symmetrical half links, each having shanks of unequal length, the ends of said shanks being inclined at an acute angle to their axes and formed for sliding dovetailed engagement with each other.

2. A link including two symmetrical half links, each having shanks of unequal length, the ends of said shanks being inclined at an angle to their axes and formed for sliding engagement with each other, one end of each being mortised and undercut, while its other end is formed with a shouldered tenon.

3. A link including two symmetrical half links each having shanks of unequal length, the ends of said shanks being inclined at an angle to their axes and formed for sliding engagement with each other, one end of each being mortised and undercut, while its other end is formed with a shouldered tenon, the tenon of each half link being adapted for engagement in the mortise of the other half link with its shoulders seated in the undercut portion thereof, and means formed integrally with said half links for positively locking the two together.

4. A link including two symmetrical half links, each having shanks of different lengths, the longer shank of each half link being formed with a shouldered tenon, the free outer edge portion of which is cut-away, the shorter shank of each link member being formed with an undercut mortise adapted to receive the tenon of the other half link member and provided with a lip extending over the cut-away portion of the tenon when the link is in assembled position, said lip being capable of being struck down to engage against the beveled face formed by the cut-away portion.

In testimony whereof I affix my signature in presence of two witnesses.

MAURICE TOBIN. [L. S.]

Witnesses:
G. E. MAUSER,
J. B. KEARSE.

---

Copies of this patent may be obtained for five cents each, by addressing the "Commissioner of Patents, Washington, D. C."